Jan. 1, 1946.   C. STEVENS   2,392,010
FLAW DETECTOR FOR SHEET MATERIAL
Filed Feb. 17, 1943
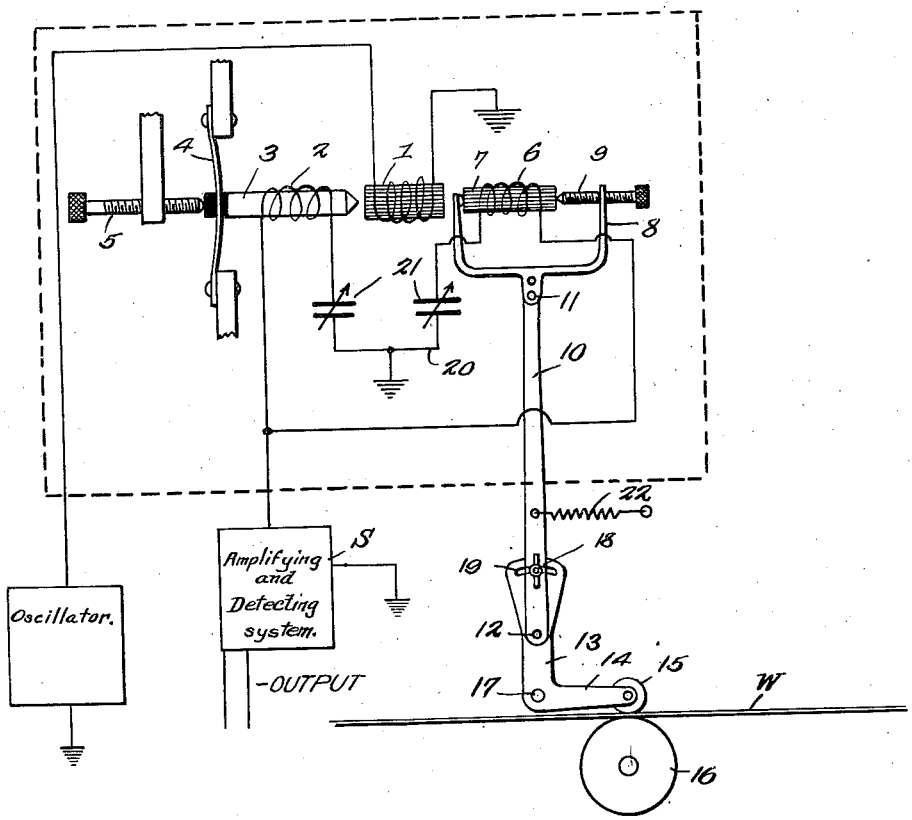
Charles Stevens
INVENTOR.
BY Patented Jan. 1, 1946

2,392,010

UNITED STATES PATENT OFFICE 2,392,010

FLAW DETECTOR FOR SHEET MATERIAL

Charles Stevens, Wellston, Ohio

Application February 17, 1943, Serial No. 476,236

2 Claims. (Cl. 177—311)

This invention relates to apparatus for use in detecting flaws in the structural characteristics of sheet material, such as paper, textiles, etc., and, more especially, for detecting variations in thickness.

An object of the invention is to provide a balanced circuit supplied with an induced current from an oscillator circuit, there being simple but very efficient means whereby the induced circuit will be thrown out of balance whenever the thickness of the material under test departs from normal, such action resulting in a current which is detected and amplified.

Another object is to provide a normally balanced circuit having opposed feeder coils 180° out of phase one of which has a laminated soft iron core provided with means whereby variations in thickness of the material under test will result in shifting said core out of normal position, thereby to disturb the balance of the circuit in which the coil is located.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing, which is a view partly in diagram and partly in elevation, the preferred form of the invention has been shown.

In said drawing:

1 designates a feeder coil located in an oscillator circuit whereby pulsations of high frequency are produced in the coil. At one side of the coil and substantially coaxial therewith is a pick-up coil 2 on a magnetic core 3 and this coil with its core can be adjusted toward or from the feeder coil 1 in any suitable manner. For example it can be connected to a leaf spring or blade 4 from which it is insulated and this leaf spring, which is anchored at its ends, can be placed under tension by an adjusting screw 5. By actuating this screw the coil 2 can be moved toward the feeder coil and spring 4 can be placed under increased tension, whereas as by releasing the spring from tension, whereas as by releasing the spring from pressure by the screw, said spring will operate to move the coil 2 away from the feeder coil 1.

At the opposite side of the feeder coil and substantially coaxial therewith is a second pick-up coil 6 having mounted in fixed relation a laminated soft iron core 7. Coil 6 is 180° out of phase with coil 2 and its core is carried by a yoke 8 which can be of insulating material and can carry a clamping screw 9 for holding the core securely in the yoke. Said yoke is detachably connected to an arm 10, as indicated at 11. The arm 10, in turn, is pivotally attached, as at 12, to one arm 13 of a lever 14 the other arm of which carries a roller 15 adapted to contact with one surface of the sheet material W under test. Located opposite to the roller 15 is a supporting roll 16 for the web. Lever 13—14 is fulcrumed at 17, and the arm 10 is mounted for angular adjustment on arm 13 to which it can be secured against relative movement by a bolt 18 extending into an arcuate slot 19.

The inner terminals of the pick-up coils 2 and 6 are electrically connected to ground as indicated at 20, there being a variable condenser 21 in each said connection at opposite sides of the ground. The outer terminals of the two coils are connected to an amplifying and detecting system S as shown.

In practice a portion of a web of material to be tested and which portion is of required thickness, is placed between roller 15 and roll 16, and while it is contacted thereby, arm 10 is adjusted to bring core 7 with its coil 6 in such position relative to the feeder coil as to substantially balance the circuit. Minute adjustment of this circuit to bring it to perfect balance can be effected by manipulating the variable condensers 21.

As the circuit is tuned to resonance, the current will be supplied regularly to the amplifying and detecting system as long as there is no variation in the thickness of the web being passed between roller 15 and roll 16. When, however, said roller comes into engagement with a portion of the web which is not of the desired thickness, arm 10 will either be swung toward the feeder coil against the action of a restraining spring 22 or else this spring will pull arm 10 and the core 7 away from the coil 1. In either case the current induced into the coils 2 and 6 will be thrown off balance, thereby producing a resultant current which will be amplified and detected.

From the foregoing it will be noted that any variation in the thickness of the web can be quickly determined and the detected portion can subsequently be discarded by any means provided for that purpose.

It is to be understood that the oscillator circuit and the amplifying and detecting circuit can be of any preferred construction but in practice they have been of the type disclosed in my co-pending application, filed Feb. 17, 1943, Serial No. 476,234.

What is claimed is:

1. In apparatus for precisely detecting variations in web thickness, web calipering means, a source of high-frequency oscillations, a feeder coil connected to said source, a first and a second pick-up coil mounted in spaced relation to said feeder coil adjacent the respective ends of said feeder coil and substantially coaxially therewith and in flux linkage relation therewith, individual ferromagnetic cores fixedly positioned in each of said pick-up coils respectively, displaceable mounting means carrying the core of said second pick-up coil and adapted to displace said core and said second pick-up coil axially thereof, link means connecting said mounting means and said calipering means, current detecting means, and interconnections between the terminals of said pick-up coils interconnecting the same in opposition and being connected to said detecting means, whereby deviations in web thickness cause changes in the output current delivered from said pick-up coils to said detecting means.

2. In apparatus for precisely detecting variations in web thickness, web calipering means, a source of high-frequency oscillations, a feeder coil connected to said source, a first and a second pick-up coil mounted in spaced relation to said feeder coil adjacent the respective ends of said feeder coil and substantially coaxially therewith and in flux linkage relation therewith, individual ferromagnetic cores fixedly positioned in each of said pick-up coils respectively, displaceable mounting means carrying the core of said second pick-up coil and adapted to displace said core and said second pick-up coil axially thereof, link means connecting said mounting means and said calipering means, a connection between a first end of each of said pick-up coils and comprising two tuning condensers in series, current detecting means having one terminal connected to the second end of each of said pick-up coils and having its other terminal connected to the common interconnection of said tuning condensers, said connections being so poled and arranged that the voltages induced in said pick-up coils oppose each other, whereby deviations in web thickness cause changes in the output current delivered from said pick-up coils to said detecting means.

CHARLES STEVENS.